United States Patent [19]

Wypart et al.

[11] Patent Number: 5,198,504
[45] Date of Patent: Mar. 30, 1993

[54] THERMOPLASTIC ELASTOMERS COMPRISING VINYL HALIDE GRAFTED TO CROSSLINKED ACRYLIC LATEXES

[75] Inventors: Roman W. Wypart, Avon Lake; Vic Stanislawczyk, North Ridgeville; Miles B. Dearth, Brecksville; Douglas E. Skillicorn, Elyria, all of Ohio

[73] Assignee: The B. F. Goodrich Company, Brecksville, Ohio

[21] Appl. No.: 931,803

[22] Filed: Sep. 28, 1992

Related U.S. Application Data

[62] Division of Ser. No. 546,168, Jun. 28, 1990, Pat. No. 5,175,216.

[51] Int. Cl.$^5$ .................... C08F 265/04; C08F 265/02
[52] U.S. Cl. .................................. 525/301; 525/308; 525/317
[58] Field of Search ............... 525/301, 308, 317

[56] References Cited

U.S. PATENT DOCUMENTS

| | | | |
|---|---|---|---|
| 3,760,035 | 5/1971 | Kelley | 260/876 R |
| 3,832,318 | 8/1974 | Gallagher et al. | 260/29.7 |
| 4,173,596 | 11/1979 | DeWitt | 428/402 |
| 4,752,639 | 6/1988 | Haller et al. | 525/66 |
| 4,801,646 | 1/1989 | Henton | 525/71 |
| 4,939,212 | 7/1990 | Mikofalvy et al. | 525/317 |
| 4,981,907 | 1/1991 | Klippert et al. | 525/317 |
| 4,997,859 | 3/1991 | Min et al. | 525/317 |

Primary Examiner—James J. Seidleck
Assistant Examiner—Vasu S. Jagannathan
Attorney, Agent, or Firm—Miles B. Dearth

[57] ABSTRACT

Thermoplastic elastomer resins are described which comprise vinyl halide grafted to crosslinked acrylic latex particles comprising predominantly acrylate-containing, crosslinked polymer chains derived from (A) at least one acrylate monomer of the formula $$CH_2=C(R_1)C(O)OR_2 \quad (I)$$

wherein $R_1$ is hydrogen or methyl; and $R_2$ is an alkyl group containing from 1 to 29 carbon atoms, an alkoxy alkyl or alkyl thioalkyl group containing from 2 to about 7 carbon atoms, or a cyano alkyl group containing from 2 to about 7 carbon atoms; and (B) at least one alpha, beta-unsaturated dicarboxylic acid, provided that the dicarboxylic acid repeating units are optional when the TPE resin contains less than about 35% by weight of vinyl halide.

An improved process is described for preparing the crosslinked acrylic latexes utilized in the preparation of TPEs, and a process is described for preparing TPEs of the invention which comprises (A) preparing a crosslinked acrylic latex by polymerizing in water a mixture comprising at least one acrylate monomer of Formula I, and at least one multifunctional crosslinking monomer, an initiator, and from 0 to about 20 phm of at least one alpha, beta-unsaturated dicarboxylic acid while delaying the polymerization of at least a portion of the crosslinking monomer until at least a portion of the acrylic monomer has polymerized;

(B) grafting a vinyl halide monomer to the crosslinked latex particles prepared in step (A) in water in the presence of a second initiator to form aqueous mixture containing a TPE resin;

(C) recovering the TPE resin from the aqueous mixture; and (D) compounding with suitable additives to produce useful thermoplastic elastomers.

9 Claims, No Drawings

THERMOPLASTIC ELASTOMERS COMPRISING VINYL HALIDE GRAFTED TO CROSSLINKED ACRYLIC LATEXES

This is a divisional application of Ser. No. 546,168 filed Jun. 28, 1990 now U.S. Pat. No. 5,175,216.

FIELD OF THE INVENTION

This invention relates to soft thermoplastic elastomers (TPE), and more particularly to TPE's comprising vinyl halides grafted to crosslinked acrylic latexes. The invention also relates to processes for preparing the crosslinked acrylic latex and the thermoplastic elastomers made therefrom.

BACKGROUND OF THE INVENTION

Many TPE compositions have been developed to combine the properties of soft rubbery materials with the properties of thermoplastics. Common TPE polymer combinations include polyvinyl chloride (PVC) and acrylonitrile butadiene (NBR) rubber; polystyrene/elastomer block copolymers; and polypropylene/ethylenepropylene diene terpolymers (EPDM) for example. A background article reviewing thermoplastic elastomers is found in *Rubber Technology*, 3rd Ed., by Maurice Morton, Van Nostrand Reinhold Co., NY (1987), p. 466.

There are references disclosing thermoplastic polyvinyl chloride (PVC) which has been modified to yield TPE properties. For example, high molecular weight plasticizers, or compatible rubbers such as NBR may be blended with PVC. Physical blending of polymers of acrylic acid esters with PVC to produce flexible polyvinyl chloride is known. Blending of an acrylate latex into a PVC polymer suspension and co-coagulating this mixture is also known.

A quite different method for combining an acrylate polymer with PVC involves polymerizing vinyl chloride in the presence of a preformed acrylate polymer. Intimate mixing of the PVC and acrylate phases including grafting between the phases is possible by the method. In some instances it is desirable to use a crosslinked acrylate rubber phase as this presumably preserves a more discreet soft phase dispersed within the vinyl "hard" phase.

This method of modifying PVC with acrylate ester polymers is described in U.S. Pat. No. 3,760,035. Blends of rubbery alkyl acrylate polymers and hard vinyl chloride resins are described by an overpolymerization method using a dispersion or suspension process without coagulation of the latex particles. A multi-stage process is claimed. In the first stage, a highly gelled or insoluble polyacrylate rubber is overpolymerized on polyvinyl chloride seed latex resulting in the deposition of a thin layer of rubbery acrylate polymer on the PVC seed particles. In the second stage the rubber-coated latex particles are subjected to an overpolymerization process. Preferably, the second stage product contains between about 35 and abouat 300% by weight of the hard resin deposit, or, otherwise stated, between about 3 to about 65% by weight, more often, from about 10 to about 25% by weight of the rubbery polyacrylate ingredient, and from about 97 to about 35% by weight, more often from about 90 to about 75% by weight of the hard vinyl chloride matrix resin. The product of the first stage acts as an impact modifier. This work is directed toward minimizing the effective level of impact modifier so as to preserve the desirable physical properties and chemical resistance of the PVC resin. Best results reportedly are obtained when the resin in final form contains about 5 to 6% by weight of crosslinked acrylate rubber relative to polymerized vinyl chloride. However, the claimed maximum for the acrylate component is 65%.

Surprisingly, the same invention directed toward soft, acrylate modified PVC materials made using the overpolymerization method is disclosed in U.S. Pat. No. 4,752,639. Flexible to soft articles are derived from thermoplastic compounds containing vinyl chloride-acrylic ester graft copolymers. Claimed compositions range from 20 to 60% by weight of acrylic ester, 40 to 80% by weight of vinyl chloride, and 0 to 30% by weight of other ethylenically unsaturated comonomers. Articles may optionally contain other plastics, fillers, processing aids and conventional additives. Solution, suspension or, preferably, emulsion polymerization processes are disclosed. The preferred forms are considered flexible, tough and "rubbery" but are not directed toward compositions which possess predominantly crosslinked elastomeric properties such as creep resistance, low temperature modulus and high temperature compression set.

No disclosures have been found which are directed toward compositions of PVC and acrylate ester rubbers in which the rubber phase dominates the thermo-plastic phase over a wide temperature range. Moreover, high molecular weight, crosslinked acrylate rubbers which can be melt processed as thermoplastic materials are heretofore undisclosed. The present invention involves the surprising discovery that it is possible to incorporate PVC onto particles of crosslinked acrylate rubber within the claimed range to give a material exhibiting the properties of a crosslinked elastomer over a wide temperature range, while exhibiting flow at elevated temperatures enabling the material to be melt-processed as a thermoplastic.

SUMMARY OF THE INVENTION

Thermoplastic elastomer resins (TPE resins) are described which comprise vinyl halide grafted to a crosslinked acrylic latex having polymer particles comprising predominantly acrylate-containing, crosslinked polymer chains derived from (A) at least one acrylate monomer of the formula $$CH_2=C(R_1)C(O)OR_2 \qquad (I)$$

wherein $R_1$ is hydrogen or methyl; and $R_2$ is an alkyl group containing from 1 to 20 carbon atoms, an alkoxy alkyl or alkyl thioalkyl group containing from 2 to about 7 carbon atoms, or a cyano alkyl group containing from 2 to about 7 carbon atoms; and (B) at least one alpha, beta-unsaturated dicarboxylic acid, provided that the dicarboxylic acid repeating units are optional when the TPE resin contains less than about 35% by weight of vinyl halide.

An improved process is described for preparing the crosslinked acrylic latexes utilized in the preparation of TPE resins, and a process is described for preparing TPE resins of the invention which comprises (A) preparing a crosslinked acrylic latex by polymerizing in water a mixture comprising at least one acrylic monomer of Formula I, and at least one multifunctional crosslinking monomer, at least one initiator, and from 0 to about 20 phm of at least one alpha, betaunsaturated dicarboxylic acid while delaying the polymerization of at least a portion of the crosslinking monomer until at least a portion of the acrylic monomer has polymerized;

(B) grafting a vinyl halide monomer to the crosslinked latex prepared in step (A) in water in the presence of at least one second initiator to form an aqueous mixture containing a TPE;

(C) recovering the TPE resin from the aqueous mixture in the form of a free-flowing powder; and (D) compounding with suitable additives to produce useful thermoplastic elastomers.

DESCRIPTION OF THE PREFERRED EMBODIMENTS

Throughout the specification and claims, all parts and percentages are by weight, temperatures are in degrees Celsius and pressures are at or near atmospheric pressure unless otherwise clearly indicated.

The term thermoplastic elastomer as used in this specification and claims refers to materials that combine the properties of thermoplasticity and rubber-like behavior. That is, they are processed on conventional plastics equipment, such as injection molders, blow molders, sheet and profile extruders, and so forth, but develop their final rubber-like properties immediately on cooling. Conventionally crosslinked rubber articles, on the other hand, must be vulcanized to give useful crosslinked properties. This is a slow, irreversible process and takes place in a heated mold. In processing thermoplastic elastomers, however, the transition from a flowable melt to a solid rubber-like object is rapid, largely reversible, and takes place on cooling.

The term "graft" or "grafted" as used in this specification and claims is to be given its broadest meaning to include the vinyl halide incorporated into the TPE resin of the invention in a manner which renders the polyvinyl halide non-extractable to solvents such as THF. Thus, a portion of the polyvinyl halide may be chemically bonded to the acrylic latex by covalent bonding. Alternatively, other associative forces may be involved including chain entanglement. Generally graft levels may range from about 1% to about 40-50% or more. Some portion of the vinyl halide will be extractable.

The TPE resins of the present invention comprise a vinyl halide grafted to a crosslinked acrylic latex having polymer particles comprising predominantly acrylate-containing, crosslinked polymer chains including repeating units derived from (A) at least one acrylate monomer; and optionally (B) at least one alpha, beta-unsaturated dicarboxylic acid.

The Crosslinked Acrylic Latex

The acrylate monomers useful in preparing the crosslinked acrylic latex generally may be characterized by the formula

$$CH_2=C(R_1)C(O)OR_2 \qquad (I)$$

wherein $R_1$ is hydrogen or methyl; and $R_2$ is an alkyl group containing from 1 to about 20 carbon atoms, an alkoxy alkyl or alkyl thioalkyl group containing from 2 to about 7 carbon atoms, or a cyano alkyl group containing from 2 to about 7 carbon atoms. In one preferred embodiment, mixtures of 2 or more copolymerizable acrylate monomers of Formula I are utilized, and the acrylate monomers are selected from the acrylates of Formula I wherein $R_2$ are alkyl groups containing from 1 to about 8 carbon atoms. In a more preferred embodiment, more than one copolymerizable alkyl acrylate monomer is utilized and at least 40 phm (parts per 100 parts of monomer in a crosslinked acrylic latex) of said alkyl acrylate is present as an alkyl acrylate in which the alkyl group contains from 1 to 8 carbon atoms and more preferably from 4 to 8 carbon atoms.

The copolymerizable acrylic monomers of Formula I are preferably those in which $R_1$ is hydrogen and $R_2$ is an alkyl group containing from 1 to 8 carbon atoms or an alkoxy alkyl group containing from 2 to 8 carbon atoms. Either of these alkyl groups may contain a primary, secondary or tertiary carbon atom. Examples of such copolymerizable acrylates include methyl acrylate, ethyl acrylate, n-propyl acrylate, n-butyl acrylate, isobutyl acrylate, n-pentyl acrylate, hexyl acrylate, 2-methylpentyl acrylate, and octyl acrylate and 2-ethylhexyl acrylate. Examples of preferred alkoxy alkyl acrylates include methoxy methyl acrylate, ethoxy ethyl acrylate, etc. Examples of other acrylates of Formula I include methylthioethyl acrylate, cyanoethyl acrylate and cyanopropyl acrylate. Mixtures of any two or more of the above-identified acrylates may be used in the formation of the acrylic latex.

When it is desired to include a portion of carboxylic acid functionality in the latex, such functionality may be introduced by use of an alpha, beta-unsaturated dicarboxylic acid monomer, or the carboxylic functionality may be introduced by the addition of a carboxylic acid-containing material. However, it is desirable to select such a carboxylic acid functional material or comonomer which contributes minimal or at least controlled thickening action to the latex itself over a broad pH range.

The alpha, beta-unsaturated dicarboxylic acids which may be present as repeating units in the cross-linked polymer chains include, for example, maleic acid, fumaric acid, citraconic acid, and itaconic acid (IA). Itaconic acid is the preferred dicarboxylic acid.

The acrylic latex is best prepared by polymerizing the acrylate monomer or monomer mixture with from about 0 to about 8 phm of the alpha, beta-unsaturated dicarboxylic acid and from about 0.1 phm to about 8 phm of a multifunctional crosslinking monomer (MFCM) with a free radical generating initiator at a temperature in the range of from about 0° C. to about 100° C. and at a pressure ranging from about 1 atmosphere to about 10 atmospheres or more. Higher levels of the alpha, betaunsaturated dicarboxylic acid, for example, up to about 20 phm may be used, but the properties of the latex thus formed are not sufficiently improved over those of a latex formed with less than 8 phm of the dicarboxylic acid, and the rate of polymerization is reduced by the presence of the excess dicarboxylic acid. Moreover, a larger amount of residual monomer remains in the acrylic latex when an excessive amount of the dicarboxylic acid is included in the polymerizable mixture. When the dicarboxylic acid monomer is citraconic acid, the polymerization may be conducted at or near the upper temperature limits.

The multifunctional crosslinking monomers (MFCM) utilized in the preparation of the acrylic latex are monomers capable of reacting with a free radical at more than one site for the purpose of forming a branch or a crosslink at the incorporation point in the polymer chain. Examples of useful multifunctional crosslinking monomers include multifunctional acrylates containing (meth)acrylate unsaturation at 2, 3 or more sites on each monomer molecule. In one embodiment, the multifunctional crosslinking monomers are selected from the group consisting of monomeric polyesters of acrylic or methacrylic acids and polyhydric alcohols; and monomeric polyalkenyl polyethers of polyhydric alcohols containing from 2 to about 6 polymerizable alkenyl ether groups per polyether molecule. More preferably, the crosslinking monomer is a monomeric polyester of an acrylic or methacrylic acid and a polyhydric alcohol containing from 2 to about 6 polymerizable acrylic acid groups per polyester molecule. Specific examples of the crosslinking monomers include trimethylol propane triacrylate (TMPTA), trimethylol propane trimethacrylate (TMPTMA), diethylene glycol diacrylate (DEGDA), diethylene glycol dimethacrylate (DEGDMA), trimethylene glycol diacrylate, butylene glycol diacrylate, pentamethylene glycol diacrylate, octylene glycol diacrylate, glyceryl diacrylate, glyceryl triacrylate, neopentyl glycol diacrylate, the tetraacrylate ester of pentaerythritol, etc.

It is understood that certain monounsaturated monomers may act in varying degrees to further crosslink or branch the latex of the invention. For example, acrylate monomers with abstractable hydrogens, which can function as radical reactive sites, can in some embodiments of this invention, form a more branched or crosslinked polymer, thus affecting the preferred levels of the multifunctional acrylate type crosslinkers. An example of a monounsaturated monomer with an abstractable hydrogen is 2-ethylhexyl acrylate. Butadiene and isoprene, if incorporated into the latex, can also serve to crosslink the polymer.

In addition to the acrylate monomer, alpha, beta-unsaturated dicarboxylic acid and multifunctional crosslinking monomer, the polymerizable monomer mixture may contain other copolymerizable monomers selected from monoolefins containing from 2 to about 10 carbon atoms; vinyl and allyl carboxylates containing from 2 to about 10 carbon atoms; vinyl ketones containing from 4 to about 20 carbon atoms; allyl ethers containing from 4 to about 20 carbon atoms; vinyl aromatics containing from 8 to about 20 carbon atoms; vinyl nitriles containing from 3 to about 6 carbon atoms; vinyl amides containing from 4 to about 20 carbon atoms; dienes and divinyls containing from 4 to about 20 carbon atoms; unsaturated carboxylic esters and amides containing from 4 to about 20 carbon atoms; unsaturated monocarboxylic acids containing from 3 to 5 carbon atoms, etc. Specific examples of the monoolefins include ethylene, propylene, isobutylene, 1-hexene, 1-octene, etc. Specific examples of vinyl and allyl carboxylates include vinyl acetate, vinyl propionate, vinyl laurate, allyl acetate, etc. Examples of vinyl ketones include methyl vinyl ketone and ethyl vinyl ketone. Allyl ethers are represented by vinyl methyl ether, vinyl ethyl ether, vinyl-n-butyl ether, allyl methyl ether, etc. The vinyl aromatics are exemplified by styrene, alpha-methyl styrene, p-n-butyl styrene, p-n-octyl styrene, vinyl toluene, etc. Examples of vinyl nitrile include acrylonitrile and methacrylonitrile, and the vinyl amides are exemplified by acrylamide, methacrylamide, N-methylolacrylamide, etc. Examples of dienes and divinyls include butadiene, isoprene, divinyl benzene and divinyl ether. The unsaturated carboxylic esters and unsaturated amides are exemplified by dimethyl fumarate, dibutyl itaconate, and the half-ethyl ester of itaconic acid. Examples of unsaturated monocarboxylic acids include acrylic acid, methacrylic acid, ethacrylic acid, etc.

The polymerization mixtures also contain an initiator which may be utilized in combination with an oxidation-reduction catalyst. The initiator is used in an amount which results in a suitable rate of polymerization chosen to provide a desirable temperature profile during the course of the formation of the latex. Commonly used initiators include a free radical initiator such as the peroxygen compounds and persulfates, particularly benzoyl peroxide, t-butyl diperphthalate, pelargonyl peroxide and 1-hydroxy cyclohexyl hydroperoxide; azo compounds such as azodiisobutyrylnitrile and dimethylazodiisobutyrylnitrile. Particularly useful initiators are the water-soluble peroxygen compounds such as hydrogen peroxide, sodium persulfate, potassium persulfate and ammonium persulfate used individually or in activated systems. Typical oxidation-reduction systems include alkali metal persulfates in combination with a reducing substance such as polyhydroxyphenols, oxidizable sulfur compounds such as sodium sulfite, sodium bisulfite, reducing sugars, dimethyl amino propionitrile, diazomercapto compounds and water-soluble ferricyanide compounds. Heavy metal ions also may be used to advantageously control initiator decomposition rates. A preferred initiator in one embodiment is an alkali metal persulfate.

The initiators may be conventionally charged either to the reactor or mixed into a premix, or both. Alternatively, initiators can be incrementally added separately to the reaction mixture to control the rate of polymerization. The amount of initiators used is in the range of from about 0.01 to about 10 phm, and more preferably from about 0.1 to about 0.5 phm. Exposure of the multifunctional crosslinking monomer to initiator radicals consumes radical reactive sites in the multifunctional crosslinking monomer. Therefore, initiator levels must be chosen to give desired crosslinking levels given the types and amounts of multifunctional crosslinking monomer used. A second consideration pertains to possible residual initiator effects on subsequent grafting reactions with the vinyl halide. In many embodiments of this invention given these considerations, lower initiator levels are preferred.

In a typical latex formulation, an alpha, beta-unsaturated dicarboxylic acid is present in an amount of from about 0 to about 20 phm, the multifunctional crosslinking monomer is present in the range of from about 0.1 to about 20 phm, and the copolymerizable acrylate monomer (and other optional copolymerizable monomers) are present in amounts of from about 60 to about 99.9 phm. In a more preferred latex formulation, the amount of the alpha, beta-unsaturated dicarboxylic acid is from about 0.1 to about 8 phm, the crosslinking monomer is present in the range of from about 0.1 to about 10 phm, and the amount of the copolymerizable acrylate monomer and other copolymerizable monomers is from about 80 to about 99.8 phm.

The properties of the latex may be varied by choosing and varying the amounts of each of the ingredients, by altering the polymerization conditions as well as by choosing particular multifunctional crosslinking monomers and copolymerizable monomers. As mentioned above, in many instances, more than one crosslinking monomer, and more than one copolymerizable monomer may be copolymerized, but when copolymerizable monomers in addition to the alkyl acrylate monomers of Formula I are utilized, the monomer mixture should comprise at least 40 phm of an alkyl acrylate containing from 1 to 8 carbon atoms in the alkyl group. That is, at least 40 phm of the copolymerizable monomer mixture should be one or more alkyl acrylates such as methyl acrylate, ethyl acrylate, n-butyl acrylate, and 2-ethylhexyl acrylate.

It is preferred to add most, if not all of the alpha, beta-unsaturated dicarboxylic acid, when utilized in the formation of the latex, into the reactor before adding the remaining monomers of the recipe. The addition of the remaining monomers together with the conventional additives such as soaps, initiators, stabilizers, antioxidants, buffers, etc., is controlled so as not to exceed the heat-removal capacity of the reactor. Controlled addition is also sometimes necessary to produce a stable latex with low levels of residual monomers.

The crosslinked acrylic latex is prepared in aqueous media, and conventional emulsifiers, both anionic and nonionic can be used in the aqueous medium to produce a latex. Emulsifiers and emulsifier levels must be selected with several considerations in mind. First the emulsifier and the emulsifier level must be chosen so as not to interfere with the subsequent grafting (suspension) process, and to yield acceptable polymer stability and morphology when used in combination with the surfactants used during the subsequent grafting process. The emulsifier type and emulsifier level is also preferably chosen so as not to cause or accelerate the degradation of the grafted polymer and not to adversely affect the physical properties of the finished polymer. Additionally the emulsifiers and emulsifier levels must be chosen to give a suitable latex particle size with acceptable latex stability.

Useful emulsifiers include alkali metal and ammonium salts of the sulfates of $C_{8-18}$ alcohols such as sodium lauryl sulfate, ethanol amine lauryl sulfate, and ethyl amine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthylene sulfonate; alkali metal and ammonium salts of aromatic sulfonic acids, aralkyl sulfonic acids, long chain alkyl sulfonic acids, poly(oxyalkylene) sulfonic acids and sulfonated dicarboxylic acid esters such as sodium dioctyl sulfosuccinate and disodium-N-octadecyl sulfosuccinate; alkali metal and ammonium salts of the free acid of complex organic mono- and diphosphate esters; and copolymerizable surfactants such as vinyl sulfonate and the like. Useful nonionic emulsifiers include octyl- or nonyl phenyl polyethoxyethanol. In one embodiment, alpha-olefin sulfonates are preferred.

Addition of the emulsifier, often referred to as a "soap" or "surfactant", is conventional. The emulsifier may be added to the reactor along with the alpha, beta-unsaturated dicarboxylic acid when used in the process, or the emulsifier may be premixed with other ingredients added gradually to the reactor, or distributed between the reactor and the premix, or otherwise added during the polymerization.

The amount of emulsifier used is in the range of from about 0.01 to about 10 phm, preferably from about 0.05 to about 1.0 phm. When the alpha, beta-unsaturated dicarboxylic acids are included near the upper limit of the preferred range, correspondingly larger amounts of emulsifiers are required to maintain a desirable particle diameter in a range of from about 1000 to about 5000 Angstroms. Copolymerizable emulsifiers or latex stabilizing monomers or polymers may be used in addition to or in place of more conventional emulsifiers.

The polymerization of the monomer mixture to form the latex of the invention can be conducted by procedures known to those skilled in the art. In one embodiment wherein itaconic acid is included in the monomer mixture, a premix comprising all of the components except for the itaconic acid and initiator is prepared and added continuously to a reactor vessel containing water, itaconic acid and initiator under agitation.

In one preferred embodiment, the crosslinked acrylic latex is prepared in a manner which results in the delaying of the polymerization of at least a portion of the multifunctional crosslinking monomers until at least a portion of the acrylate monomers has polymerized. This delayed polymerization reaction is preferred because it is believed that the delayed reaction of the multifunctional crosslinking monomer results in the localization of more of the multifunctional crosslinking monomer closer to the particle surfaces while also moderating the reaction of multifunctional crosslinking monomer reactive sites due to the reduced exposure of the multifunctional crosslinking monomer reactive sites to free radicals. Such delayed polymerization of the crosslinking monomer can be accomplished by gradually, incrementally or wholly adding the crosslinking monomer to the acrylate monomer mixture after the initiation of polymerization has occurred and at a point during the polymerization which is desired.

In one embodiment, the delayed crosslinking process involves the steps of (A) preparing a crosslinking acrylic latex by polymerizing in water, an initial mixture comprising at least one acrylic monomer of Formula I, at least one multifunctional crosslinking monomer, an initiator, and from 0 to 20 phm of at least one alpha, beta-unsaturated dicarboxylic acid, and after initiation of the polymerization when at least a portion of the initial monomer mixture has polymerized, adding the remaining portion of multifunctional crosslinking monomer to the initial mixture as the polymerization proceeds to completion. Variations can be made in the process, such as delaying the addition in the relative amounts of multifunctional crosslinking monomer used in the initial mixture and added to the mixture after polymerization of the initial mixture has progressed to the desired degree. For example, of the total amount of multifunctional crosslinking monomer to be used in the process, about 5 to about 25% may be included in the initial monomer mixture, and from about 75 to 95% added to the initial monomer mixture after polymerization has been initiated and progressed to the desired degree. For example, about 10%, 20%, or 30% or more of the acrylate monomer in the initial monomer mixture may be copolymerized before the additional multifunctional crosslinking monomer is added. The extent to which the initial mixture has been copolymerized prior to the addition of the additional multifunctional crosslinking monomer may be varied over a wide range depending upon the desired properties for the latex which affect the ultimate properties of the TPE made therefrom.

The latex which is formed by any of the processes of the present invention may have as little as about 10% and as much as about 68% by weight or more of solids. The obtained latex is typically treated or processed to reduce residual monomers, and the pH is adjusted to a desired value, usually in the range of from about 3 to about 10. The latex is then filtered through, for example, cheese cloth or a fabric filter, and stored for further processing. The latex generally has a total solids content which may range from about 30 to about 60% and more typically is from about 40% to about 55% by weight.

When the water is removed from the latex, the dry latex polymer preferably has a Tg in the range of from about 0° C. to about −80° C. The polymer may have more than one Tg. The Tg of the polymer is determined by conventional differential thermal analysis (DTA). The choice of suitable copolymerizable monomers for producing polymers with specified Tg is facilitated by reference to known formulae and data found in references such as *Mechanical Properties of Polymers*, by L. E. Nielsen, Reinhold Publishing Corp. (1967), and in particular, in Chapter II thereof which teaches transitions in polymers and provides a list of Tg values of many polymers including films of acrylate polymers of the types described herein.

It will be evident from the above discussion regarding choice of monomers which in combination have a Tg in the specified range, some trial and error relating to tailoring the composition and process will generally be desirable in order to form a latex with specific properties. For example, an amount, in the range of 0.1 phm to about 40 phm, of a "hard" copolymerizable monomer, may be used. A "hard" copolymerizable monomer is one, the homopolymer of which has a Tg of about 80° C. or more. Examples of such "hard" comonomers are $C_{8-12}$ vinyl aromatics including styrene, alpha-methyl styrene and vinyl toluene: vinyl nitriles such as acrylonitrile and methacrylonitrile. Vinyl chloride and vinyl benzochloride may be used in an amount in the range of from about 0.1 phm to 25 phm, depending upon the Tg to be maintained.

The following examples illustrate the preparation of crosslinked acrylic latexes useful in the present invention.

EXAMPLE L-1

A stainless steel reactor is charged with 350 parts of demineralized water, 7 parts of itaconic acid (IA) and 1.7 parts of alpha-olefin sulfonate (40% in water) (AOS) with agitation. The reactor is evacuated, and the last vacuum is broken with nitrogen to 1 psig. The contents of the reactor are heated to 75° C.

In a second stainless steel vessel, the following materials are premixed with agitation: 251 parts of demineralized water, 10.5 parts of alpha-olefin sulfonate (40% in water); 13.3 parts of trimethylol propane triacrylate (TMPTA) and 13.3 parts of trimethylol propane trimethacrylate (TMPTMA); 281.4 parts of n-butyl acrylate (nBA) and 385 parts of 2-ethylhexyl acrylate (EHA).

A solution of 1.4 parts of sodium persulfate in 10.5 parts of demineralized water is added to the reactor, and the time of this addition is recorded as t=0 minute. The premixed ingredients are then pumped continuously from the second stainless steel vessel into the reactor at a rate of about 5.3 parts per minute starting at t=1 minute.

In a third stainless steel vessel, the following solution is prepared: 70 parts of demineralized water; 0.175 part of AOS (40% in water); 0.35 part of sodium carbonate and 0.35 part of sodium persulfate. The contents of this third vessel are metered into the reactor starting at t=0+30 minutes at a rate of about 0.34 part per minute.

After the second vessel finished metering into the reactor, the reactor temperature is raised to about 83° C. and maintained at this temperature until two hours after the contents of the third vessel have been added to the reactor.

The latex formed in the reactor is cooled, and a solution containing 1.4 parts of sodium carbonate and 21 parts of water is added to the latex. The latex of this example is the latex used in Example TPE-1.

EXAMPLE L-2

To a stainless steel reactor, there are added, 350 parts of demineralized water, 7 parts of itaconic acid and 1.7 parts of alpha-olefin sulfonate (40% in water). The reactor is evacuated, and the last vacuum is broken with nitrogen to 1 psig. The reactor then is heated to about 75° C.

In a second stainless steel vessel, the following components are premixed with agitation: 251 parts of demineralized water, 10.5 parts of alpha-olefin sulfonate (40% in water), 1.4 parts of trimethylol propane triacrylate, 1.4 parts of trimethylol propane trimethacrylate, 281.4 parts of n-butyl acrylate, and 385 parts of 2-ethylhexyl acrylate.

A solution of 1.4 parts of sodium persulfate in 10.5 parts of demineralized water is added to the reactor, and the time of this addition is recorded as t=0 min. The premixed ingredients prepared in the second stainless steel vessel are pumped continuously from the vessel into the reactor at a rate of 5.3 parts per minute starting at t=1 min.

A third stainless steel vessel contains the following ingredients in solution: 70 parts of demineralized water, 0.175 part of alpha-olefin sulfonate (40% in water), 0.35 part of sodium carbonate and 0.35 part of sodium persulfate. The contents of this third vessel are metered into the reactor starting at t=0.30 min. at a rate of 0.34 part per minute. At t=0.60 min., the following mixture of crosslinking monomers is added all at once to the second vessel: 11.9 parts of TMPTMA and 11.9 parts of TMPTA. When the metering of the contents of the second vessel into the reactor is completed, the reactor temperature is raised to about 83° C. and maintained at this temperature for 2 hours after the addition of the contents of the third vessel to the reactor is completed.

The latex is cooled, and a solution of 1.4 parts of sodium carbonate in 21 parts of demineralized water is added to the reactor. The latex thus obtained is then filtered and recovered for subsequent processing.

The acrylic latex described above is characterized as comprising polymer particles which are predominantly acrylate-containing, crosslinked polymer chains including repeating units derived from (A) the acrylate monomer or monomers utilized in the preparation; and (B) itaconic acid. In preferred embodiments, the latex does include repeating units of alpha, beta-unsaturated dicarboxylic acids, and in particular, itaconic acid wherein the amount of dicarboxylic acid or itaconic acid included in the reaction mixture is from about 0.1 to about 20 phm and more often from about 0.1 to about 8 phm.

The monomer compositions of the latexes used in the TPE examples are shown in Tables I through III. The compositions consist of a mixture of alkyl acrylate esters, one or more multifunctional crosslinking monomers and itaconic acid. The ingredients shown are 2-ethylhexyl acrylate, (EHA), n-butyl acrylate, (n-BA), tri-methylol propane tri-acrylate (TMPTA), tri-methylol propane tri- methacrylate (TMPTMA) neopentylglycol di-methacrylate (NPGDM), di-ethylene glycol di-methacrylate (DEGDM) and butane diol di-methacrylate.

The Thermoplastic Elastomer Resins and Thermoplastic Elastomers

The TPE resins of this invention comprise a vinyl halide grafted to the crosslinked acrylic latex described. A carboxylic acid-containing component such as an alpha, beta-unsaturated dicarboxylic acid is present in the latex when the TPE is to be prepared containing more than about 35% by weight of vinyl halide. When the TPE resin contains less than about 35% by weight of vinyl halide, a carboxylic acid-containing component such as an alpha, beta-unsaturated dicarboxylic acid is optional, but in some instances, preferred.

The TPE resin of the present invention generally will contain from about 10 to about 40 phr (parts per 100 parts of resin) of vinyl halide. In one preferred embodiment, the TPE resin of the invention will contain from about 15 to about 40 phr of vinyl halide, and the latex will contain from about 0.1 to about 8 phm of an alpha, beta-unsaturated dicarboxylic acid such as itaconic acid. Although various vinyl halides may be utilized, vinyl chloride is the preferred vinyl halide.

Various procedures for grafting of the vinyl chloride to crosslinked acrylic latexes may be utilized. The grafting process of the present invention can be carried out in dispersions, emulsions or suspensions, particularly aqueous dispersions and aqueous suspensions. The grafting process can be conducted in the aqueous latexes as described above without coagulating the latex before grafting.

Mixtures of vinyl chloride and one or more copolymerizable monovinylidene monomers (i.e., those containing a single $CH_2=C<$ group per molecule) such as vinylidene chloride, vinyl acetate, acrylic or methacrylic esters, olefins such as ethylene or propylene, etc., may be grafted to the acrylic latexes. Generally, such mixtures will comprise at least 80 weight percent of the vinyl chloride and less than 20 weight percent (preferably less than about 5% by weight) of the other copolymerizable monomers. Although much of the discussion which follows will refer to grafting of vinyl halides, it should be understood that such discussion also is applicable to grafting with the above monomer mixtures containing vinyl chloride.

The grafting reaction is conducted, as mentioned above, in either a dispersion, emulsion, or suspension process. In addition to the vinyl chloride and the acrylic latex, the dispersion or emulsion also may contain other components such as initiators, stabilizers, emulsifiers, and/or dispersants known in the art. The amounts of such dispersants and emulsifiers incorporated into the dispersions and emulsions will vary depending upon the nature of the dispersion or emulsion, but the amounts and types of dispersants and emulsifiers can be readily determined.

The polymerization is initiated with a free radical initiator. Monomer-soluble or latex-soluble initiators useful in the polymerization process of this invention may include the alkanoyl, aroyl, alkaroyl, and aralkanoyl diperoxides and monohydroperoxides, azo compounds, peroxy esters, percarbonates, and other free radical type initiators. As examples of such initiators there may be named benzoyl peroxide, lauroyl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, alpha-cumyl peroxyneodecanoate, di-normal propyl peroxydicarbonate, di-2-ethylhexyl peroxydicarbonate, azo-bis isobutyronitrile, alpha, alpha'-azodiisobutyrate, 2,2'-azo-bis-(2,4-dimethyl valeronitrile) and many others. Examples of colloidally active suspension polymerization stabilizers or dispersants include polyvinyl alcohol, cellulose derivatives such as methyl cellulose, hydroxypropyl, methyl cellulose, sodium acrylate, polyacrylic acids, glue, gelatin, or bentonite clay or combinations thereof.

The grafting reaction is carried out in a closed vessel. The oxygen within the vessel is purged. The grafting reaction is effected at any temperature between about 0° C. and 100° C., and is more preferably carried out at a temperature of from about 35 to about 65° C. The graft reaction is continued, as is conventional for vinyl chloride resins, until about 40 to about 80% of the total vinyl chloride monomer has been converted to polymer though any vinyl conversion may be employed.

In one preferred embodiment, the grafting process is carried out in a reactor charged with water, dispersants and the acrylic latex under agitation. After closing and evacuating the vessel, the initiator and the vinyl chloride monomer is charged and agitation is continued as the contents of the reactor are heated to the reaction temperature. The pH of the reaction mixture may be raised by the addition of a base such as sodium hydroxide or potassium hydroxide. It has been observed that the increase in pH to a range of about 8-10 during the graft reaction results in reduction of the particle size of the resulting TPE resin due to decreased particle agglomeration.

Upon completion of the graft polymerization reaction, the polymer is stripped to remove unreacted monomer, filtered and dried.

The TPE resins of the present invention are characterized as TPE resins which are melt processable rubbers. The TPE resins exhibit a desirable combination of properties including good low temperature flexibility and low modulus, low compression set, high strength and toughness and other desirable properties. The thermo-plastic elastomers of the present invention, when prepared from an acrylic latex containing a carboxylic acid component such as an alpha, beta-unsaturated dicarboxylic acid, e.g., itaconic acid, exhibit a lower modulus and a lower brittleness temperature as well as a reduction in melt index or melt flow. It also is observed that the presence of a carboxylic acid component such as an alpha, beta-unsaturated dicarboxylic acid can result in reduction in the buildup of undesirable materials on the reactor surfaces. It also has been observed that as the dicarboxylic acid level increases in the TPE resin, the oil swell is reduced, and at lower levels of itaconic acid, increased tensile properties are obtained. The properties of the TPE resins of the present invention can be adjusted, as mentioned, by varying the acrylate monomer composition, by optionally employing a carboxylic acid containing component, varying the level of the carboxylic acid component, and also by varying the type, level and location of the multifunctional crosslinking monomer in the latex. Moreover, the properties of the TPE resin are critically controlled by varying the amount of the vinyl chloride grafted to the acrylic latex in the formation of the TPE resins of the present invention. Furthermore, properties of the TPE resin can be adjusted by varying the polymerization temperatuare which affects molecular weight of the grafted polyvinyl chloride. The molecular weight may also be controlled by the use of chain transfer agents known in the art. The following examples illustrate the preparation of some thermoplastic elastomers of the present invention. In the following examples, TPE-1 through TPE-3, the latexes used are prepared in accordance with the general procedure of Example L-1.

EXAMPLE TPE-1

A reactor is charged with 105.9 parts of water, 2.87 parts of polyvinyl alcohol dispersant 1 (5.58% solution in water), 1.04 parts of polyvinyl alcohol dispersant to (4.83% solution in water), 4.62 parts of a cellulose dispersant (2.38% solution in water) and 120 parts of a latex prepared from a mixture comprising 40% of 2-ethylhexyl acrylate, 55.9% of n-butyl acrylate, 0.5% of itaconic acid, 1.8% of TMPTMA and 1.8% TMPTA. The latex contains 49.8% total solids. After closing and evacuating the reaction vessel, 40 parts of vinyl chloride monomer are charged, and agitation of the contents of the reactor is begun. The reactor is then heated to 55° C. and 0 016 part of di-sec butylperoxydicarbonate is injected when this temperature is reached. The polymerization is continued until the pressure drops to 500 KPa and the reaction is short-stopped. After cooling, the polymer slurry is transferred to a stripping vessel to remove unreacted monomer, and the polymer is recovered by filtration and dried. The polymer prepared in this manner contains 32.2% polyvinyl chloride as measured by chlorine analysis.

EXAMPLES TPE-2 AND TPE-3

The general procedure of Example TPE-1 is repeated utilizing different acrylic latexes an different amounts of vinyl chloride monomer. The identification of the various compounding ingredients and the amounts of each of the ingredients utilized in Examples TPE-1 to TPE-3 are summarized in the following Table I. Table I also contains a summary of some of the properties of the TPEs compounded using the following compounding recipe.

| Recipe | |
|---|---|
| Ingredients | Parts by Wt. |
| Resin | 100 |
| Tin Stabilizer | 1.8 |
| Antioxidant | 0.35 |
| Internal Lubricant | 0.75 |
| External Lubricant No. 1 | 0.3 |
| External Lubricant No. 2 | 0.1 |

The above ingredients are premixed in a beaker and processed on a 6" by 13" two-roll mill at a roll-mill temperature of 378° F. (192° C.) and processed for about 3 minutes. The compounded thermoplastic elastomer is removed from the mill in the form of a sheet and samples of 6" by 6" by 0.09" were cut from the sheet and pressed at 350° F. (177° C.) for 6 minutes for physical testing.

TABLE I

| Thermoplastic Elastomers and Properties | | | |
|---|---|---|---|
| | TPE-1 | TPE-2 | TPE-3 |
| Vinyl Chloride [%] | 32.2 | 38.2 | 42.5 |
| Latex Composition | | | |
| EHA [%] | 40.0 | 55.9 | 40.0 |
| n-BA [%] | 55.9 | 40.0 | 55.9 |
| TMPTMA [%] | 1.8 | 1.8 | 1.8 |
| TMPTA [%] | 1.8 | 1.8 | 1.8 |
| IA [%] | 0.5 | 0.5 | 0.5 |
| Physical Properties | | | |
| Hardness [ShA/ShD] (ASTM D-2240) | 75 | 84 | 94/43 |
| Compression Set [%] (ASTM D-395) (22 hrs, 100° C., Method B) | 30.0 | 30.4 | 33.4 |
| Compression Set [%] (ASTM D-395) (22 hrs, Room Temp., Method B) | 30.8 | 52.2 | 74.5 |
| Tensile Strength [psi] (ASTM D-638) | 1336 | 1398 | 2296 |
| Elongation [%] | 136 | 110 | 130 |
| Clashberg Modulus [psi] (ASTM D-1043) (at −35° C.) | 7742 | 8258 | 22826 |
| Clashberg Stiffness [°C.] (ASTM D-1043) (at 45000 psi) | −52 | −53 | −46 |
| Graves Tear [ppi] (ASTM D-624) | 68 | 110 | 221 |
| Brittleness Temperature [°C.] (ASTM D-746) | −44 | −45 | −44 |
| Specific Gravity [g/cm$^3$] | 1.12 | 1.14 | 1.16 |
| Oil Immersion [%] (ASTM D-471) (ASTM #3 Oil, 100° C., 166 hrs) | 88.6 | 94.7 | 68.9 |

It should be noted from the data in Table I that as the level of PVC exceeds 40%, the Clashberg modulus dramatically increases. There is also a corresponding deterioration in compression set properties. This is indicative of a critical transition in the bulk properties of the graft polymer where in the preferred elastomeric properties at PVC levels below 40% were discovered. Moreover, it has been discovered that above the critical level of about 40% PVC, the thermoplastic properties predominate and are not preferred in the present invention.

Examples TPE-4 through TPE-12 shown in Tables II and III represent TPE resins made with the latex compositions listed. However, in these examples, the polymerization method described in L-2 was followed in preparing the latexes. The method in L-2 is preferred and results in significant improvement in compression set properties. Such improvement is achieved without a sacrifice in low temperature modulus. By inspection of Table II it is shown that the choice of MFCM can affect the properties of the TPE resin.

EXAMPLES TPE-4 to TPE-8

The components and the amount of the components utilized in the formation of TPEs of Examples TPE-4 through TPE-8 are summarized in the following Table II which also contains a summary of the properties of the TPEs compounded utilizing the above compounding recipe and the compounding process described above with respect to Examples TPE-1 to TPE-3.

TABLE II

| Thermoplastic Elastomers and Properties | | | | | |
|---|---|---|---|---|---|
| | TPE-4 | TPE-5 | TPE-6 | TPE-7 | TPE-8 |
| Vinyl Chloride [%] | 33.1 | 34.7 | 32.3 | 31.1 | 25.1 |
| Latex Composition | | | | | |
| EHA [%] | 55.0 | 55.0 | 55.0 | 55.0 | 55.0 |
| n-BA [%] | 40.2 | 40.2 | 40.2 | 40.2 | 40.2 |

TABLE II-continued

Thermoplastic Elastomers and Properties

|  | TPE-4 | TPE-5 | TPE-6 | TPE-7 | TPE-8 |
|---|---|---|---|---|---|
| TMPTMA [%] | 3.8 | — | — | — | — |
| TMPTA [%] | — | 3.8 | — | — | — |
| IA [%] | 1.0 | 1.0 | 1.0 | 1.0 | 1.0 |
| NPGDM [%] | — | — | 3.8 | — | — |
| DEGDM [%] | — | — | — | 3.8 | — |
| BDDM [%] | — | — | — | — | 3.8 |
| Physical Properties | | | | | |
| Hardness [ShA/ShD] (ASTM D-2240) | 55 | 74 | 46 | 38 | 53 |
| Compression Set [%] (ASTM D-395) (22 hrs, 100° C., Method B) | 22.3 | 24.1 | 28.0 | 34.8 | 26.4 |
| Compression Set [%] (ASTM D-395) (22 hrs, Room Temperature, Method B) | 13.2 | 25.1 | 13.9 | 12.7 | 16.0 |
| Tensile Strength [psi] (ASTM D-638) | 1096 | 1254 | 832 | 805 | 722 |
| Elongation [%] | 171 | 97 | 188 | 239 | 144 |
| Tensile Modulus [psi] | 835 | 1480 | 757 | 468 | 572 |
| Clashberg Modulus [psi] (ASTM D-1043) (at −35° C.) | 6023 | 14307 | 3846 | 3906 | 1360 |
| Clashberg Stiffness [°C.] (ASTM D-1043) (at 45000 psi) | −50 | −46 | −52 | −54 | −61 |
| Brittleness Temperature [°C.] (ASTM D-746) | −49 | −45 | −52 | −53 | −53 |
| Specific Gravity [g/cm$^3$] | 1.12 | 1.13 | 1.11 | 1.11 | 1.09 |
| Taber Abrasion [g] | .17 | .41 | .14 | .13 | .01 |
| Oil Immersion [%] (ASTM D-471) (ASTM #3 Oil, 100° C., 166 hrs) | 123 | 79 | 151 | 177 | 147 |

EXAMPLES TPE-9 TO TEP-12

The general procedure described for TPE-1 is followed in these examples, but the amounts of vinyl chloride, acrylate monomers, crosslinking agents and itaconic acid are varied. In Examples TPE-9 and TPE-10, the latex copolymer composition contains no itaconic acid. The identification of the components and the amount of components utilized in the preparation of these TPEs are summarized in the following Table III. Table III also contains a summary of some of the properties of the TPEs compounded with the following compounding recipe and using the general procedure described with regard to compounding of the TPEs of Examples TPE-1 to TPE-3.

Compounding Recipe

| Ingredients | Parts by Wt. |
|---|---|
| Thermoplastic Elastomer | 100 |
| Tin Stabilizer | 1.8 |
| Internal Lubricant | 0.75 |
| Antioxidant | 0.2 |
| External Lubricant-1 | 0.3 |
| External Lubricant-2 | 0.1 |

TABLE III

Thermoplastic Elastomers and Properties

|  | TPE-9 | TPE-10 | TPE-11 | TPE-12 |
|---|---|---|---|---|
| Vinyl Chloride [%] | 31.2 | 34.8 | 33.61 | 28.6 |
| Latex Composition | | | | |
| EHA [%] | 55.0 | 55.0 | 55.0 | 55.0 |
| n-BA [%] | 41.2 | 41.2 | 40.2 | 40.2 |
| TMPTMA [%] | 1.9 | 1.9 | 1.9 | 1.9 |
| TMPTA [%] | 1.9 | 1.9 | 1.9 | 1.9 |
| IA [%] | — | — | 1.0 | 1.0 |
| Physical Properties | | | | |
| Hardness [ShA/ShD] (ASTM D-2240) | 46 | 56 | 58 | 58 |
| Compression Set [%] (ASTM D-395) (22 hrs, 100° C., Method B) | 25.1 | 29.3 | 30.1 | 19.2 |
| Compression Set [%] (ASTM D-395) (22 hrs, Room Temperature, Method B) | 23.2 | 29.4 | 19.1 | 22.3 |
| Tensile Strength [psi] | 838 | 1058 | 1064 | 678 |
| Tensile Strength 100% [psi] | 387.4 | 551.1 | 521.6 | 663 |
| Elongation [%] | 179 | 176 | 183 | 101 |
| Tensile Modulus [psi] (ASTM D-638) | 611 | 689 | 701 | 832 |
| Clashberg Modulus [psi] (ASTM D-1043) (at −35° C.) | 5871 | 9977 | 8762 | 5600 |
| Clashberg Stiffness [°C.] (ASTM D-1043) (at 45000 psi) | −53 | −48 | −50 | −51 |
| Brittleness Temperature [°C.] (ASTM D-746) | −41 | −40 | −47 | −46 |
| Specific Gravity [g/cm$^3$] | 1.12 | 1.13 | 1.12 | 1.11 |
| Oil Immersion [%] (ASTM D-471) (ASTM #3 Oil, 100° C., 166 hrs) | 159 | 149 | 120 | 105 |
| Melt Index (185° C., 21600 g Load) | 3.23 | 0.92 | <.1 | <.1 |

As can be seen from properties reported in Table III, the incorporation of itaconic acid into the latex lowers the brittleness temperature significantly, and the melt flow index is reduced. Additionally, the presence of itaconic acid reduces oil swell as shown by oil immersion results.

It has been observed that the TPE resins of the present invention exhibit unusual morphology when the elastomer is dried and examined prior to any extrusion or working of the elastomer. When the dried TPE resins of the present invention are examined microscopically, it has been observed that the morphology of the dried elastomer comprises particles or agglomerates of particles having a primary particle size of from about 2 to about 50 microns. These primary particles of vinyl chloride contain dispersed latex particles generally having an average particle size of from about 0.02 to about 1 micron within the primary particle. Dispersed latex particles are also attached to the surface of the primary particles.

It also has been observed that when the graft-polymerization process is conducted at a higher pH by the addition of an alkaline material such as sodium hydroxide to raise the pH of the polymerizable mixture to about 8 to 10, examination of the morphology of the dried elastomer thus obtained indicates that conducting the polymerization at the higher pH results in the reduction in the amount of agglomerates of primary particles present in the dried elastomer and an increase in unagglomerated primary particles.

To the TPE resins of the present invention can also be added known in PVC compounding additives in conventional amounts. Thus, various heat stabilizers such as barium/zinc compounds, barium/cadmium/-zinc compounds, barium/cadmium compounds, lead compounds, and organotin compounds, various conventional lubricants such as paraffin, polyethylene, stearic acid, ester lubricants, various processing aids such as polyacrylates, polystyrenes, various antioxidants such as butylated hydroxy toluene or BHT, butylated hydroxy anisole or BHA, various hindered phenols, various UV inhibitors such as substituted benzophenones, and the like, can be utilized.

Various fillers and pigments can also be utilized in conventional amounts such as up to about 200 parts by weight for every 100 parts by weight of the TPE resin. Examples of fillers include calcium carbonate, clay, silica and various silicates, talc, carbon black and the like. Examples of various pigments include titanium dioxide, carbon black and the like. Generally, the amount of such pigment is not as large as the amount of the fillers. Carbon black and titanium dioxide can be used in larger amounts than needed for pigmentation in order to improve weatherability.

The various additives, fillers, pigments and the like, along with the optional plasticizers and optional elastomeric polymers/flexible materials are generally added and blended in any conventional manner. For example, the vinyl chloride TPE polymer(s) can be blended with the various additives in a Banbury mixer and then processed on a two-roll mill to produce a sheet which can be cubed and then extruded, injection molded and the like. The vinyl chloride polymer(s) can also be mixed with the various additives in an intensity mixer such as a Henschel mixer or ribbon blender and then this powder compound can be processed on a two-roll mill into a sheet and cubed, or the powder compound can be processed on an extruder into pellets or into the finished article. In general, any conventional means of compounding such as a Banbury mixer, two-roll mill, Henschel mixer, ribbon blender, extruder, injection molding machine and the like can be used to produce the products of this invention.

The TPE resins of the present invention can be utilized to produce very soft products without the addition of plasticizer to the polymer product. The TPE resins containing the various additives and the like can be processed by a variety of techniques including injection molding, extrusion, extrusion blow molding, calendering, thermoforming, compression molding and the like.

The TPE resins and elastomers of the present invention may be recovered as free-flowing powders or crumbs which can have particle sizes of from about 5–1000 microns or more, and particularly from about 10–500 microns. Various shaped articles can be formed from the powders by heating, fusing and shaping to the desired configuration.

The TPE resins can be used in a wide variety of applications including but not limited to gaskets, hoses, automotive components, roofing membranes, dual durometer extrusions, weatherstrips, shoe soles, wire and cable jacketing, upholstery, tarpaulins, automotive roofing, floor mats, connectors for tubing and electrical items, tool handles, toys, small tires, wallcoverings, pond liners, conveyor belts, shoe uppers, flooring products and the like.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for preparing a thermoplastic elastomer resin which comprises
    (A) preparing a crosslinked acrylic latex by polymerizing in water, a mixture comprising at least 40 parts by weight per 100 weight parts of said latex of one acrylic monomer of formula I $$CH_2=C(R_1)C(O)OR_2 \qquad (I)$$

wherein
    $R_1$ is hydrogen or methyl; and $R_2$ is an alkyl group containing from 1 to 20 carbon atoms, an alkoxy alkyl or alkyl thioalkyl group containing from 2 to about 7 carbon atoms, or a cyano alkyl group containing from 2 to about 7 carbon atoms, at least one multifunctional crosslinking monomer, an initiator, and upto 20 phm of at least one alpha, beta-unsaturated dicarboxylic acid while delaying the addition of at least a portion of the crosslinking monomer until a portion of the acrylate monomers has polymerized;

and when at least a portion of the acrylate monomer has polymerized, adding additional multifunctional crosslinking monomer to the initial mixture as the polymerization procedes to completion;

(B) grafting from about 10 to about 40 weight parts of a vinyl halide monomer to from about 60 to 90 weight parts of the crosslinked latex prepared in step (A) in water in the presence of at least one second initiator to form an aqueous mixture containing the thermoplastic elastomer resin provided that the dicarboxylic acid repeating units are optional when the elastomer resin contains less than about 35% by weight of vinyl halide; and (C) recovering the thermoplastic elastomer resin from the aqueous mixture.

2. The process of claim 1 wherein the vinyl halide is vinyl chloride.

3. The process of claim 1 wherein, of the total amount of multifunctional crosslinking monomer used in step (A), about 5 to about 25% is included in the initial mixture.

4. The process of claim 1 wherein at least 40 phm of the acrylate monomer polymerized in step (A) is an alkyl acrylate in which the alkyl group contains from 1 to about 8 carbon atoms.

5. The process of claim 1 wherein the initial mixture comprises from about 86 phm to about 99 phm of at least one acrylate monomer, and $R_2$ is an alkyl group containing from 4 to 8 carbon atoms in at least 70 phm of said acrylate.

6. The process of claim 1 wherein the alpha, beta-unsaturated dicarboxylic acid is itaconic acid.

7. The process of claim 1 wherein the initial mixture contains from about 0.1 to about 8 phm of the unsaturated dicarboxylic acid.

8. The process of claim 1 wherein the multifunctional crosslinking monomer is at least one monomeric polyester of acrylic or methacrylic acids and a polyhydric alcohol containing from 2 to about 6 polymerizable acrylic acid groups per polyester molecule.

9. The process of claim 1 wherein the multifunctional crosslinking monomer is at least one monomeric polyester of acrylic or methacrylic acids and a polyhydric alcohol containing from 2 to about 6 polymerizable acrylic acid groups per polyester molecule.

* * * * *